US012091223B2

(12) United States Patent
Brandt

(10) Patent No.: US 12,091,223 B2
(45) Date of Patent: *Sep. 17, 2024

(54) PERFORATION PATTERN FOR MULTIVARIABLE ADJUSTABLE HEIGHT BOXES AND METHOD

(71) Applicant: Barry Brandt, Arlington Heights, IL (US)

(72) Inventor: Barry Brandt, Arlington Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,204

(22) Filed: Nov. 23, 2021

(65) Prior Publication Data

US 2022/0081151 A1 Mar. 17, 2022

Related U.S. Application Data

(63) Continuation of application No. 16/833,991, filed on Mar. 30, 2020, now Pat. No. 11,208,232, which is a (Continued)

(51) Int. Cl.

| | |
|---|---|
| ***B65D 5/355*** | (2006.01) |
| ***B31B 50/20*** | (2017.01) |
| ***B31B 50/26*** | (2017.01) |
| ***B31B 50/62*** | (2017.01) |
| ***B65D 5/02*** | (2006.01) |
| ***B65D 5/42*** | (2006.01) |
| ***B65D 5/54*** | (2006.01) |
| *B31B 50/14* | (2017.01) |
| *B31B 110/35* | (2017.01) |

(Continued)

(52) U.S. Cl.

CPC ............ *B65D 5/0005* (2013.01); *B31B 50/20* (2017.08); *B31B 50/262* (2017.08); *B31B 50/624* (2017.08); *B65D 5/0227* (2013.01); *B65D 5/4266* (2013.01); *B65D 5/5445* (2013.01); *B31B 50/142* (2017.08); *B31B 2110/35* (2017.08); *B31B 2120/302* (2017.08); *B31B 2120/70* (2017.08)

(58) Field of Classification Search

CPC .. B65D 5/0005; B65D 5/0227; B65D 5/4266; B65D 5/5445

USPC ............... 229/240, 101.1, 237, 930; 428/136

See application file for complete search history.

(56) References Cited

U.S. PATENT DOCUMENTS

| | | | | |
|---|---|---|---|---|
| 1,516,090 A * | 11/1924 | Gary | B65D 5/542 | 229/243 |
| 2,750,101 A * | 6/1956 | Jacke | B65D 5/068 | 229/203 |

(Continued)

*Primary Examiner* — Christopher R Demeree

(74) *Attorney, Agent, or Firm* — Nyman IP LLC; Scott Nyman

(57) ABSTRACT

A perforation pattern for multivarible adjustable height box is provided with improved folding, bending, and separation of adjacent panels. The multivariable perforated adjustable height box may include a box, columns, rows, glue tabs, column scores, row scores, perforations, cuts, skips, and bundle breakers. Perforation patterns may be irregular, angled, shifted, or otherwise configured to increase usability, strength, and/or other aspects of the packaging. A method to produce a packaging device with improved folding, bending, and separation of adjacent panels using the multivariable perforated adjustable height box is also provided.

17 Claims, 9 Drawing Sheets

Related U.S. Application Data continuation of application No. 15/948,117, filed on Apr. 9, 2018, now Pat. No. 10,947,003.

(60) Provisional application No. 62/523,829, filed on Jun. 23, 2017, provisional application No. 62/484,333, filed on Apr. 11, 2017.

(51) Int. Cl.
*B31B 120/30* (2017.01)
*B31B 120/70* (2017.01)

(56) References Cited

U.S. PATENT DOCUMENTS

| | | | | | |
|---|---|---|---|---|---|
| 3,313,467 | A * | 4/1967 | Anderskow | B65D 5/0005 | 229/101 |
| 4,511,042 | A * | 4/1985 | Wischusen, III | B65D 5/5007 | 229/122 |
| 4,634,007 | A * | 1/1987 | Rusnock | B65D 5/545 | 229/940 |
| 4,676,430 | A * | 6/1987 | Wischusen, III | B65D 5/5435 | 229/242 |
| 4,955,526 | A * | 9/1990 | Haase | B42D 5/025 | 229/80.5 |
| 5,054,684 | A * | 10/1991 | Farber | B65D 5/701 | 215/388 |
| D406,759 | S * | 3/1999 | Lawrence | D9/416 | |
| 6,364,199 | B1 * | 4/2002 | Rose | B65D 5/0005 | 229/101 |
| 7,306,135 | B2 * | 12/2007 | DeBusk | B65D 5/5002 | 229/101.2 |
| 7,407,087 | B2 * | 8/2008 | DeBusk | B65D 5/0005 | 229/101.2 |
| 7,562,808 | B1 * | 7/2009 | Philips | B65D 5/5021 | 229/148 |
| 9,511,894 | B2 * | 12/2016 | Wilson | B31B 50/20 | |
| D968,950 | S * | 11/2022 | Sollie | D9/416 | |
| 11,485,566 | B2 * | 11/2022 | Waltermire | B65D 31/10 | |

* cited by examiner

FIG. 7A
FIG. 7B
FIG. 7C
FIG. 7D
FIG. 7E
FIG. 7F
FIG. 7G
FIG. 7H
FIG. 7I
FIG. 7J
FIG. 7K
A B A B A B ...
A A B A A B ...
A B B A A B ...
A B C A B C ...
A B C B A B ...
A B A C A B ...
A A A B A A A ...
A D D D A D D D A ...
A D D B D D A D D ...
A E E A E E A E E A E E ...
A B A E E C A E D A ...

PERFORATION PATTERN FOR MULTIVARIABLE ADJUSTABLE HEIGHT BOXES AND METHOD

CROSS-REFERENCE TO RELATED APPLICATION

This application claims the priority from U.S. nonprovisional patent application Ser. No. 16/833,991 filed Mar. 30, 2020, which is a continuation of U.S. nonprovisional patent application Ser. No. 15/948,117 filed Apr. 9, 2018. The application additionally claims priority from U.S. provisional patent application Ser. No. 62/484,333 filed Apr. 11, 2017 and U.S. provisional patent application Ser. No. 62/523,829 filed Jun. 23, 2017. The foregoing applications are incorporated in their entirety herein by reference.

FIELD OF THE INVENTION

The present disclosure relates to a perforation pattern for multivariable adjustable height boxes. More particularly, the disclosure relates to a perforation pattern to provide packaging with improved folding, bending, and separation of adjacent panels. Additionally, the disclosure relates to improved packaging manipulation via inclusion of perforated scores and other perforations between adjacent panels.

BACKGROUND

Multi-depth and adjustable height boxes allow for configuration of a box to have several selectable depths. Traditionally, multi-depth boxes require additional steps and interactions to select a desired depth. For example, traditional multi-depth boxes often require cutting with a utility knife to create a desired depth. However, this approach leaves a box prone to imprecise cutting and uneven depths, which can destroy the box or render it unusable. One approach that unsuccessfully attempts to correct this deficiency is the inclusion of slotting. However, slotted boxes create undesired openings unless the minimum depths are selected.

Therefore, a need exists to solve the deficiencies present in the prior art. What is needed is an improved mechanism for manipulating packaging, namely, for multi-depth and adjustable height boxes. What is needed is an improved perforation for partial folding, bending, and separation of adjacent panels of packaging. What is needed is improved separating, bending, and folding techniques for packaging, including adjustable height boxes. What is needed is an an improved packaging design. What is needed is an adjustable height box and packaging with improved functionality. What is needed is a series of perforations to enhance structural strength and separability.

SUMMARY

An aspect of the disclosure advantageously provides an improved mechanism for manipulating packaging, namely, for multi-depth and adjustable height boxes. An aspect of the disclosure advantageously provides an improved perforation for partial folding, bending, and separation of adjacent panels of packaging. An aspect of the disclosure advantageously provides improved separating, bending, and folding techniques for packaging, including adjustable height boxes. An aspect of the disclosure advantageously provides an an improved packaging design. An aspect of the disclosure advantageously provides an adjustable height box and packaging with improved functionality. An aspect of the disclosure advantageously provides a series of perforations to enhance structural strength and separability.

In one aspect, a perforation pattern may be provided that can be located at least partially between adjacent columns provided by packaging. The perforation pattern may include cuts having a first cut characteristic and a second cut characteristic and skips. The cuts and the skips may be arranged in at least a first perforation pattern and a second perforation pattern included by the perforation pattern. The perforation pattern may be applied to the packaging including panels arranged in the adjacent columns.

The packaging may include a row of nonvariable panels at least partially bordered via nonvariable row scoring between the adjacent columns. The packaging may also include a row of multivariable panels at least partially bordered via the perforation pattern between the adjacent columns. A dimension of the packaging may be manipulable via at least partially separating the adjacent columns in the row of multivariable panels.

In another aspect, the first perforation pattern may differ from the second perforation pattern.

In another aspect, the row of multivariable panels may include a first row of multivariable panels associated with the first perforation pattern and a second row of multivariable panels associated with the second perforation pattern.

In another aspect, the skips may include a first skip characteristic and a second skip characteristic.

In another aspect, the skips may include a first skip having the first skip characteristic and a second skip having the second skip characteristic.

In another aspect, the cuts may include a first cut having the first cut characteristic and a second cut having the second cut characteristic.

In another aspect, the perforation pattern may be at least partially irregular.

In another aspect, the adjacent columns of the packaging may further include flaps substantially separated between the adjacent columns. In one embodiment, at least partially separating the adjacent columns in the row of multivariable columns may transform the panels of the row of multivariable columns into the flaps.

In another aspect, the perforation pattern may include a glue tab operatively connected to at least one of the panels.

In another aspect, the perforation pattern may include a pinhole.

In another aspect, the panels may be arranged in at least three columns.

In another aspect, the perforation pattern may include an angle.

In another aspect, the perforation pattern may include a shifted portion at least partially shifted from scoring located at the adjacent columns in the row of multivariable panels.

In another aspect, the first cut characteristic may be defined by a first cut length and the second cut characteristic may be defined by a second cut length that is different than the first cut length.

According to an embodiment of this disclosure, a perforation pattern located at least partially between adjacent columns provided by packaging is disclosed. The perforation pattern may include cuts including a first cut characteristic and a second cut characteristic and skips. The perforation pattern may be applied to the packaging including panels arranged in the adjacent columns. The packaging may include a row of nonvariable panels at least partially bordered via nonvariable row scoring between the adjacent columns. The packaging may also include a row of multivariable panels at least partially bordered via the perforation pattern between the adjacent columns. A dimension of the packaging may be manipulable via at least partially separating the adjacent columns in the row of multivariable panels. The row of multivariable panels may include a first row of multivariable panels associated with the first perforation pattern and a second row of multivariable panels associated with the second perforation pattern.

In another aspect, the cuts and the skips may be arranged in at least a first perforation pattern and a second perforation pattern included by the perforation pattern. The first perforation pattern may differ from the second perforation pattern.

In another aspect, the skips may include a first skip having the first skip characteristic and a second skip having the second skip characteristic. The cuts may include a first cut having the first cut characteristic and a second cut having the second cut characteristic.

According to an embodiment of this disclosure, a method aspect is provided for applying a perforation pattern to packaging at least partially between adjacent columns included by a row of multivariable panels. The method may include A) arranging cuts and skips in at least a first perforation pattern and a second perforation pattern included by the perforation pattern. The method may include B) making the cuts comprising a first cut characteristic and a second cut characteristic to the packaging between the adjacent columns included by the row of multivariable panels. The method may include C) including the skips between the cuts. The perforation pattern may be applied to the packaging comprising panels arranged in the adjacent columns. The packaging may include a row of nonvariable panels at least partially bordered via nonvariable row scoring between the adjacent columns and the row of multivariable panels at least partially bordered via the perforation pattern between the adjacent columns. A dimension of the packaging may be manipulable via at least partially separating the adjacent columns in the row of multivariable panels. The first perforation pattern may differ from the second perforation pattern.

In another aspect of the method, the row of multivariable panels may include a first row of multivariable panels associated with the first perforation pattern and a second row of multivariable panels associated with the second perforation pattern.

In another aspect of the method, the skips may include a first skip characteristic and a second skip characteristic. Step B) of the method may further include i) making a first cut having the first cut characteristic, and ii) making a second cut having the second cut characteristic. Step C) of the method may further include i) including a first skip having the first skip characteristic, and ii) including a second skip having the second skip characteristic.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
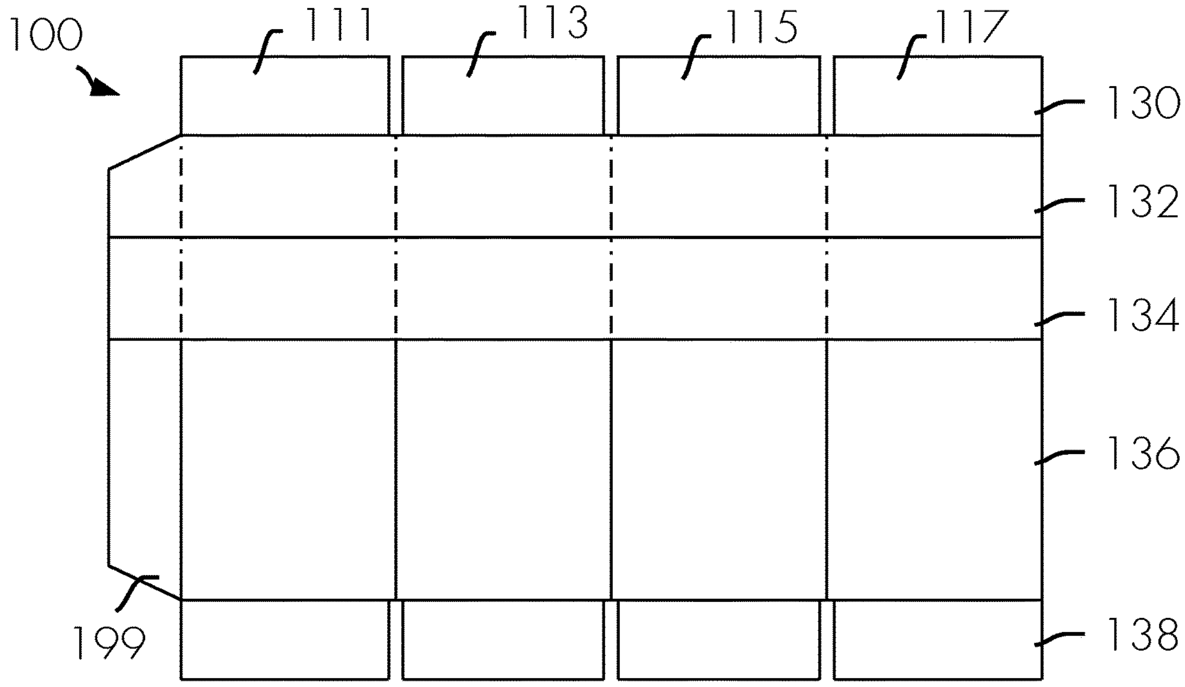
FIG. 1 is a top plan view of an embodiment of the invention prior to being folded and/or glued, according to an embodiment of this disclosure.

The following disclosure is provided to describe various embodiments of a multivariable perforated adjustable height box. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, a multivariable perforated adjustable height box will be discussed. Those of skill in the art will appreciate alternative labeling of the multivariable perforated adjustable height box as a packaging with improved folds, packaging with improved margins, packaging with perforated folds, irregularly perforated multivariable packaging, multivariable and multilevel packaging, the invention, or other similar names. Similarly, those of skill in the art will appreciate alternative labeling of the multivariable perforated adjustable height box as a packaging manipulation with improved folding, packaging manipulation via improved folds, packaging manipulation about an improved margin, variably configuring packaging with multivariable levels having perforations with enhanced strength characteristics, method, operation, the invention, or other similar names. Skilled readers should not view the inclusion of any alternative labels as limiting in any way.

Some common terminology will be used throughout the following disclosure. Such terms are intended to be controlling over any other source, including dictionary definitions and/or other terms used within the field of the applicable art. The term "irregular" is intended to mean lacking perfect symmetry or evenness. The term of "adjacent" is intended to mean near distance and/or at least partially sharing a common border. The term "shifted" is intended to mean changed in place or position. The term "varying characteristics" is intended to mean a distinguishing trait, quality, or property with at least one identifying feature that is not fixed. The term "dimension" is intended to mean a measure in one direction. The term "producing" is intended to mean to give being, form, or shape to. The term "producing" is also intended to mean to compose, create, or bring out by intellectual effort. The term "variable" is intended to mean not having a fixed configuration. The term "nonvariable" is intended to reference an item that is not intended to be variable in its current configuration, but without requiring the item to be fixed in all configurations.

Referring now to FIGS. 1-16, the perforation pattern and/or multivariable perforated adjustable height box will now be discussed in more detail. The multivariable perforated adjustable height box may include a box, columns, rows, glue tabs, column scores, row scores, perforations, cuts, skips, slots, bundle breakers, and additional components that will be discussed in greater detail below. The multivariable perforated adjustable height box may operate one or more of these components interactively with other components to provide a packaging device with improved folding, bending, and separation of adjacent panels.

The perforation pattern and/or box will now be discussed in greater detail. FIGS. 1-6 and 10-16 highlight examples of the box, which may also be shown in other figures. The term "box" may be used interchangeably throughout this disclosure with "packaging" or other similar terms without limitation, with the broader definition controlling. References to embodiments of the "box" or "packaging" are intended to additional disclose various embodiments of perforation pattern included by the box or packaging.

Figure 2:
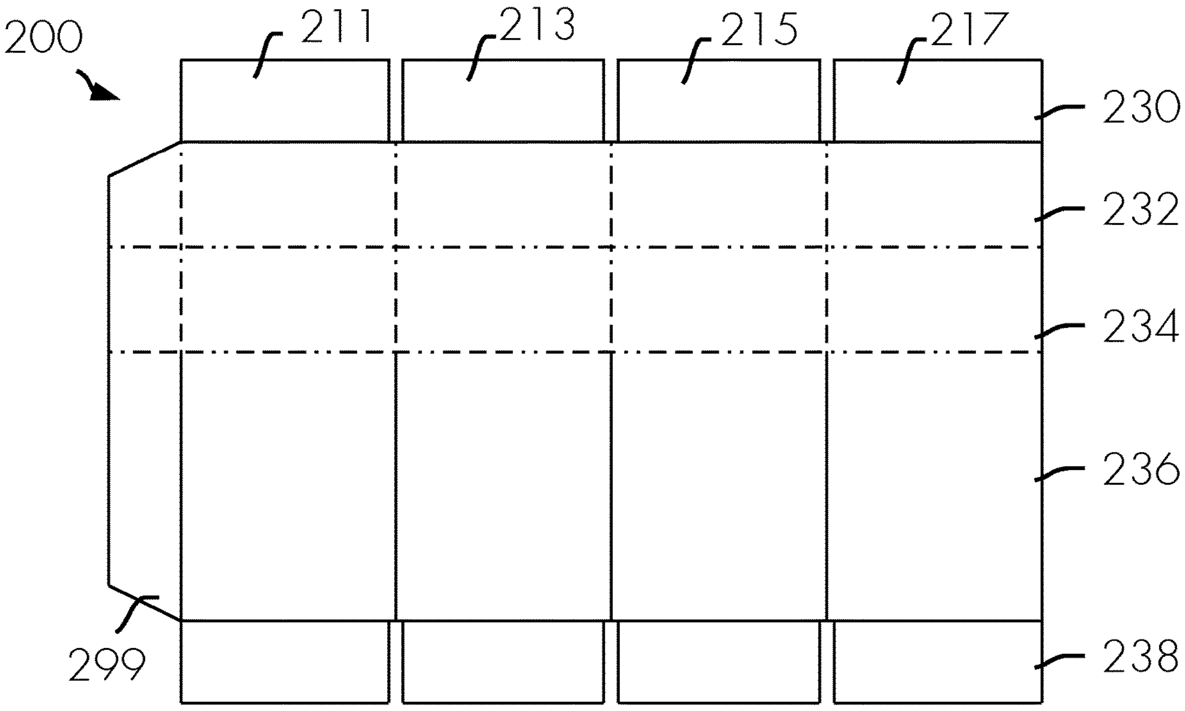
FIG. 2 is a top plan view of an embodiment of the invention prior to being folded and/or glued, according to an embodiment of this disclosure.
Figure 5:
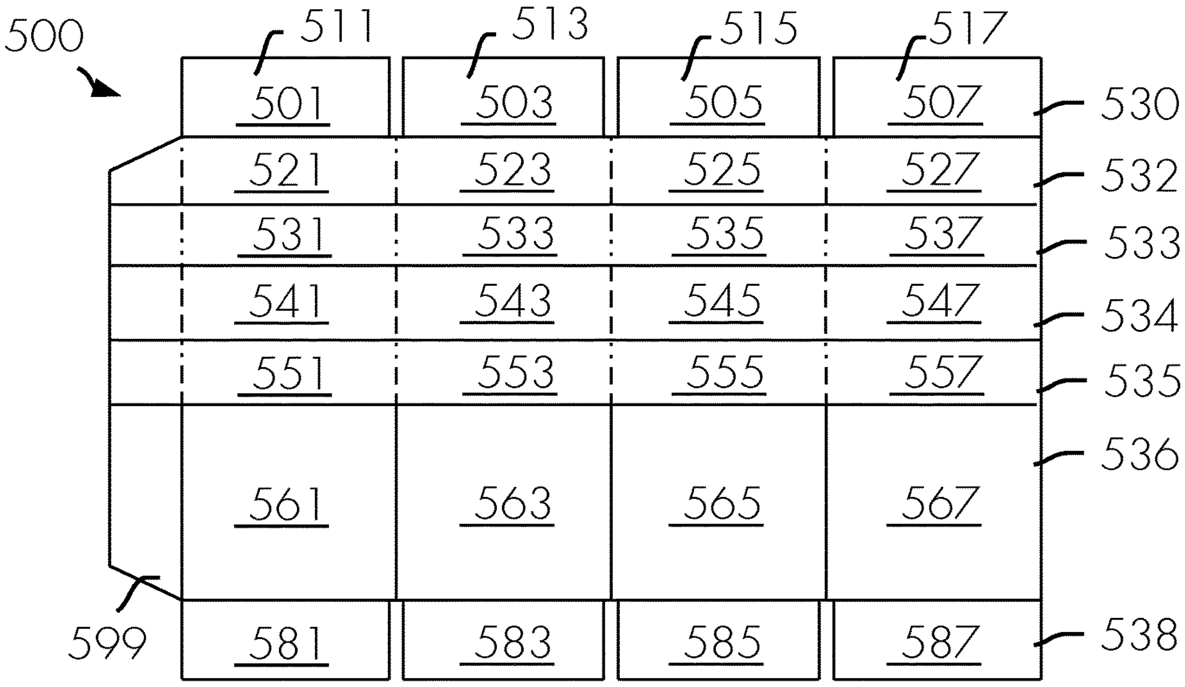
FIG. 5 is a top plan view of an embodiment of the invention prior to being folded and/or glued, according to an embodiment of this disclosure.
Figure 6:
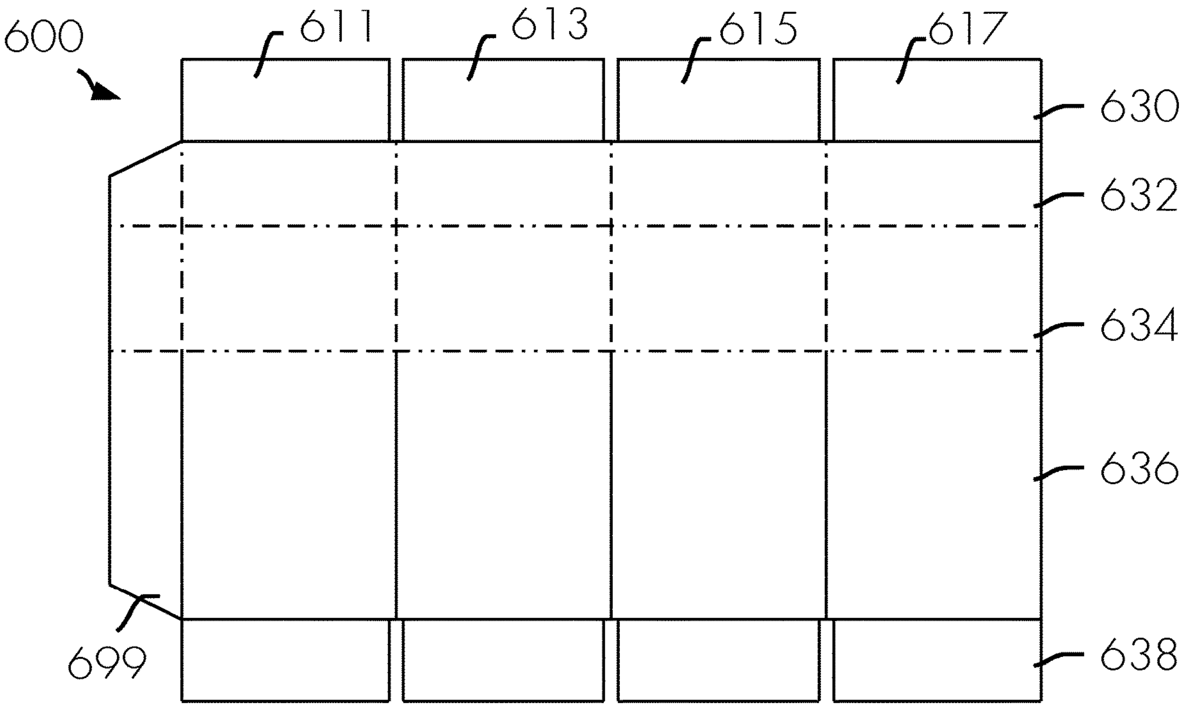
FIG. 6 is a top plan view of an embodiment of the invention prior to being folded and/or glued, according to an embodiment of this disclosure.

One or more of the panels illustrated in FIGS. 1-6 and 10-16 may be folded and/or glued together to create an assembled box. The panels may include scores between the connected adjacent columns and rows. For example, FIG. 1 shows an illustrative box 100 with columns 111, 113, 115, and 117; rows 130, 132, 134, 136, and 138; and an optional glue tab 199. In box 100, at least part of the border between adjacent columns may include scoring and substantially all the borders between adjacent rows include substantially solid scoring and/or perforations. In another example, FIG. 2, shows an illustrative box 200 with columns 211, 213, 215, and 217; rows 230, 232, 234, 236, and 238; and an optional glue tab 299. In box 200, at least part of the border between adjacent columns may include scoring and at least some of the borders between adjacent rows include substantially solid scoring or at least partial perforation. In another example, FIG. 6, shows an illustrative box 600 with columns 611, 613, 615, and 617; rows 630, 632, 634, 636, and 638; and an optional glue tab 699. In box 600, at least part of the border between adjacent columns may include scoring and at least some of the borders between adjacent rows include substantially solid scoring or at least partial perforation.

Some columns may include one or more panels that are at least partially separated, for example, by cuts, slits, slots, pinholes, and/or other perforations, which may be collectively referred to throughout this disclosure as "cuts" without limitation, from a neighboring column. In one example, top and bottom flaps may be provided by panels that are at least partially separated from panels in neighboring columns. These disconnected panels may facilitate closing of the box, for example, by being folded on top of one another. While the examples provided may display five rows of panels, skilled artisans will appreciate that virtually any number of rows may be included, without limitation. Similarly, while the examples provided may display two rows of panels separable about their respective vertical scores, skilled artisans will appreciate that virtually any number of separable rows may be included, without limitation. Additionally, the box may include any number of edges, for example and without limitation, 2, 3, 4, 5, 6, 7, 8, or more edges.

The packaging device may be constructed using various materials, for example, corrugated cardboard, chipboard, or another material that would be appreciated by those of skill in the art. The packaging device may additionally be configured having various sizes, board grades, and/or paper combinations. The packaging device of this disclosure may apply to virtually any style of box, for example, regular slotted cartons, half slotted cartons, cartons omitting one or more flaps, partial overlap cartons, full overlap cartons, die cut cartons, and other configurations that will be appreciated by persons of skill in the art after having the benefit of this disclosure. Upon assembly, the packaging device may be adjusted based on the desired size of the box.

Figure 3:
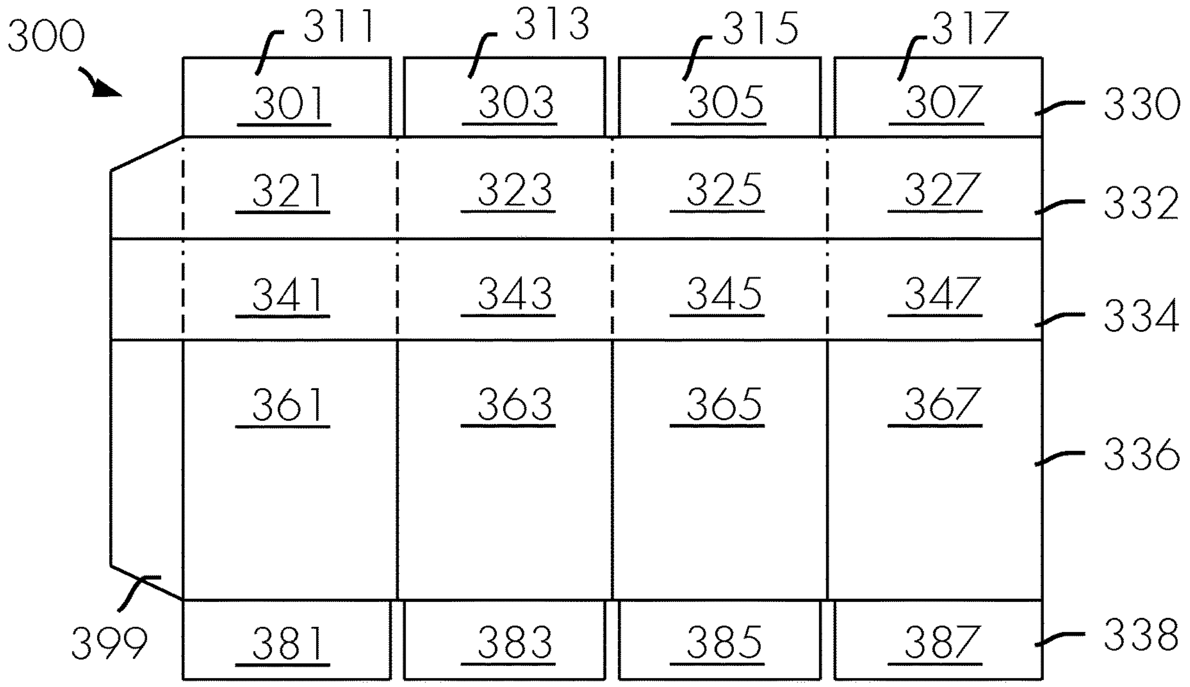
FIG. 3 is a top plan view of an embodiment of the invention with labeling prior to being folded and/or glued, according to an embodiment of this disclosure.
Figure 4:
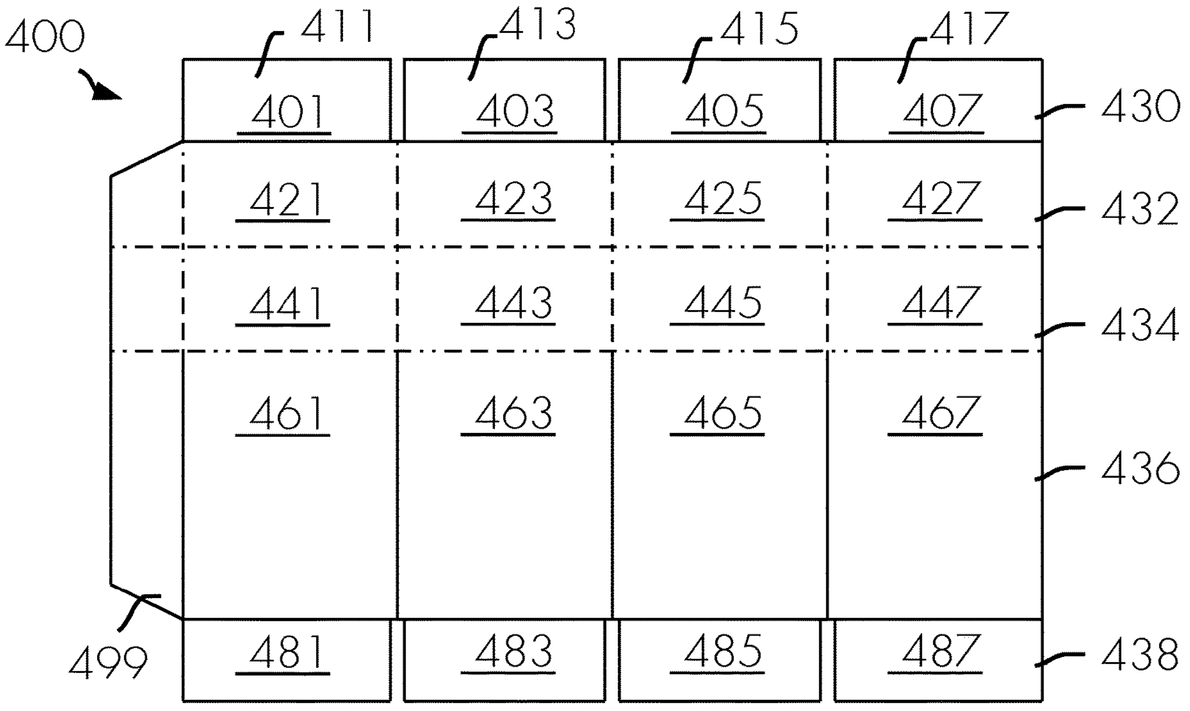
FIG. 4 is a top plan view of an embodiment of the invention with labeling prior to being folded and/or glued, according to an embodiment of this disclosure.

The columns and rows will now be discussed in greater detail. FIGS. 1-6 and 10-16 highlight examples of the columns, which may also be shown in other figures. The columns may be configured in adjacent columns. Multiple rows may include panels of adjacent columns. In one example, the rows may have different dimensions providing for panels of different sizes that are used to collectively make the box. For example, as seen in FIG. 3, a first illustrative example of the packaging device 300 may include panels arranged in columns 311, 313, 315, and 317. In another example, as seen in FIG. 4, a second illustrative example of the packaging device 400 may include panels arranged in columns 411, 413, 415, and 417. In another example, as seen in FIG. 5, a third illustrative example of the packaging device 500 may include panels arranged in columns 511, 513, 515, and 517.

Additionally, the packaging device may include rows. FIGS. 1-6 and 10-16 highlight examples of the rows, which may also be shown in other figures. The rows can include virtually any configuration of panel types. However, often the rows will include flaps, multivariable panels, or non-variable panels. For example, the rows may provide a row of separated flaps, a row of multivariable panels, a row of nonvariable panels, a row of mixed panel types, or a row of other panel configurations.

For example, as seen in FIG. 3, a first illustrative example of the packaging device 300 may include panels arranged in rows 330, 332, 334, 336, and 338. In another example, as seen in FIG. 4, a second illustrative example of the packaging device 400 may include panels arranged in rows 430, 432, 434, 436, and 438. FIG. 5 illustrates an example of packaging 500 with a larger number of included rows, namely, rows 530, 532, 533, 534, 535, 536, and 538. In these examples, rows 330, 338, 430, 438, 530, and 538 may include flaps. More specifically, rows 330, 430, and 530 may include rows of top flaps. Additionally, rows 338, 438, and 538 may include rows of bottom flaps. Rows 332, 334, 432, 434, 532, 533, 534, and 535, represent rows of multivariable panels. Rows 336, 436, and 536 represent rows of nonvariable panels. Skilled artisans will appreciate additional embodiments that include additional rows and/or columns, which are within the scope of this disclosure.

The glue tabs will now be discussed in greater detail. FIGS. 1-6 and 10-16 highlight examples of the glue tabs, which may also be shown in other figures. The packaging device may additionally include glue tabs. Glue tabs may or may not be with the box. Additionally, glue tabs may or may not be extended to the top and/or bottom of the flaps. For example, as seen in FIG. 3, a first illustrative example of the packaging device 300 may include glue tabs 399 arranged in rows 332, 334, and 336. In another example, as seen in FIG. 4, a second illustrative example of the packaging device 400 may include glue tabs 499 arranged in rows 432, 434, and 436. In another example, as seen in FIG. 5, a third illustrative example of the packaging device 500 may include glue tabs 599 arranged in rows 532, 533, 534, 535, and 536. Skilled artisans will appreciate that the glue tabs may be located at alternative positions about a box. Additionally, in some embodiments, the glue tabs may be omitted, without limitation.

The column scores will now be discussed in greater detail. FIGS. 1-6 and 10-16 highlight examples of the column scores, which may also be shown in other figures. For example, as seen in FIG. 3, a first illustrative example of the packaging device 300 may include column scores between columns 311 and 313, 313 and 315, and 315 and 317. Additional scores may be located between column 311 and the glue tab 399. In another example, as seen in FIG. 4, a second illustrative example of the packaging device 400 may include column scores between columns 411 and 413, 413 and 415, and 415 and 417. Additional scores may be located between column 411 and the glue tab 499. In another example, as seen in FIG. 5, a third illustrative example of the packaging device 500 may include column scores between columns 511 and 513, 513 and 515, and 515 and 517. Additional scores may be located between column 511 and the glue tab 599. If additional rows are included, additional column scores may be provided between the columns in each additional row.

In the first embodiment illustrated in FIG. 3, the column scores in the second and third rows 332, 334 may be at least partially perforated with a perforation pattern. The vertical perforations may include perforation patterns that may be the same different, for example, the cuts can be on the top or not. These second and third rows 332, 334 may be rows of multivariable panels. The rows of multivariable panels may include panels 321, 323, 325, 327, 341, 343, 345, and 347. Column scores in the fourth row 336 may optionally omit perforations, providing significant strength at the included scores. The fourth row 336 may be a row of nonvariable panels. The row of nonvariable panels may include panels 361, 363, 365, and 367. Rows 330 and 338 may include flaps, for example, panels 301, 303, 305, 307, 381, 383, 385, and 387.

In the example box 300, column scores may be at least partially perforated at the following junctions: glue tab 399 to panel 321, panel 321 to panel 323, panel 323 to panel 325, panel 325 to panel 327, glue tab 399 to panel 341, panel 341 to panel 343, panel 343 to panel 345, and panel 345 to panel 347. A series of perforations using a perforation pattern may be included to enhance structural strength and separability at the junctions illustrated above. Multiple perforations and/or varied perforations may be included. Borders with substantially solid scoring may be located at the following junctions: glue tab 399 to panel 361, panel 361 to panel 363, panel 363 to panel 365, and panel 365 to panel 367. For the rows 330 and 338 with flaps, a substantially full separation may be provided at the following junctions: panel 301 to panel 303, panel 303 to panel 305, panel 305 to panel 307, panel 381 to panel 383, panel 383 to panel 385, and panel 385 to panel 387. Those of skill in the art will appreciate that one or more of these junctions may include a perforation.

In the second embodiment illustrated in FIG. 4, the column scores in the second and third rows 432, 434 may be at least partially perforated with a perforation pattern. These second and third rows 432, 434 may be rows of multivariable panels. The rows of multivariable panels may include panels 421, 423, 425, 427, 441, 443, 445, and 447. Column scores in the fourth row 436 may optionally omit perforations, providing significant strength at the included scores. The fourth row 436 may be a row of nonvariable panels. The row of nonvariable panels may include panels 461, 463, 465, and 467. Rows 430 and 438 may include flaps, for example, panels 401, 403, 405, 407, 481, 483, 485, and 487.

In the example box 400, column scores may be at least partially perforated at the following junctions: glue tab 499 to panel 421, panel 421 to panel 423, panel 423 to panel 425, panel 425 to panel 427, glue tab 499 to panel 441, panel 441 to panel 443, panel 443 to panel 445, and panel 445 to panel 447. A series of perforations using a perforation pattern may be included to enhance structural strength and separability at the junctions illustrated above. Multiple perforations and/or varied perforations may be included. Borders with substantially solid scoring may be located at the following junctions: glue tab 499 to panel 461, panel 461 to panel 463, panel 463 to panel 465, and panel 465 to panel 467. For the rows 430 and 438 with flaps, a substantially full separation may be provided at the following junctions: panel 401 to panel 403, panel 403 to panel 405, panel 405 to panel 407, panel 481 to panel 483, panel 483 to panel 485, and panel 485 to panel 487. Those of skill in the art will appreciate that one or more of these junctions may include a perforation.

In the third embodiment illustrated in FIG. 5, the column scores in the second, third, fourth and fifth rows 532, 533, 534, 535 may be at least partially perforated with a perforation pattern. These second, third, fourth, and fifth rows 532, 533, 534, 535 may be rows of multivariable panels. The rows of multivariable panels may include panels 521, 523, 525, 527, 531, 533, 535, 537, 541, 543, 545, 547, 551, 553, 555, and 557. Column scores in the sixth row 536 may optionally omit perforations, providing significant strength at the included scores. The sixth row 536 may be a row of nonvariable panels. The row of nonvariable panels may include panels 561, 563, 565, and 567. Rows 530 and 538 may include flaps, for example, panels 501, 503, 505, 507, 581, 583, 585, and 587.

In the example box 500, column scores may be at least partially perforated at the following junctions: glue tab 599 to panel 521, panel 521 to panel 523, panel 523 to panel 525, panel 525 to panel 527, glue tab 599 to panel 531, panel 531 to panel 533, panel 533 to panel 535, panel 535 to panel 537, glue tab 599 to panel 541, panel 541 to panel 543, panel 543 to panel 545, panel 545 to panel 547, glue tab 599 to panel 551, panel 551 to panel 553, panel 553 to panel 555, and panel 555 to panel 557. A series of perforations using a perforation pattern may be included to enhance structural strength and separability at the junctions illustrated above. Multiple perforations and/or varied perforations may be included. Borders with substantially solid scoring may be located at the following junctions: glue tab 599 to panel 561, panel 561 to panel 563, panel 563 to panel 565, and panel 565 to panel 567. For the rows 530 and 538 with flaps, a substantially full separation may be provided at the following junctions: panel 501 to panel 503, panel 503 to panel 505, panel 505 to panel 507, panel 581 to panel 583, panel 583 to panel 585, and panel 585 to panel 587. Those of skill in the art will appreciate that one or more of these junctions may include a perforation.

The row scores will now be discussed in greater detail. FIGS. 1-6 and 10-16 highlight examples of the row scores, which may also be shown in other figures. For example, as seen in FIG. 3, a first illustrative example of the packaging device 300 may include row scores between rows 330 and 332, 332 and 334, 334 and 336, and 336 and 338. In another example, as seen in FIG. 4, a second illustrative example of the packaging device 400 may include row scores between rows 430 and 432, 432 and 434, 434 and 436, and 436 and 438. In another example, as seen in FIG. 5, a second illustrative example of the packaging device 500 may include row scores between rows 530 and 532, 532 and 533, 533 and 534, 534 and 535, 535 and 536, and 536 and 538. One or more of these row scores may include a perforation pattern.

In the first embodiment illustrated in FIG. 3, the row scores in the second and third rows 332, 334 may be scored to be substantially solid. Additional embodiments may include perforations. These second and third rows 332, 334 may be rows of multivariable panels. The rows of multivariable panels may include panels 321, 323, 325, 327, 341, 343, 345, and 347. Row scores in the fourth row 336 may also optionally omit perforations, providing significant strength at the included scores. The fourth row 336 may be a row of nonvariable panels. The row of nonvariable panels may include panels 361, 363, 365, and 367. Rows 330 and 338 may include flaps, for example, panels 301, 303, 305, 307, 381, 383, 385, and 387.

In the example box 300, borders with substantially solid scoring may be located at the following junctions: panel 301 to panel 321, panel 321 to panel 341, panel 341 to panel 361, panel 361 to panel 381, panel 303 to panel 323, panel 323 to panel 343, panel 343 to panel 363, panel 363 to panel 383, panel 305 to panel 325, panel 325 to panel 345, panel 345 to panel 365, panel 365 to panel 385, panel 307 to panel 327, panel 327 to panel 347, panel 347 to panel 367, and panel 367 to panel 387. Those of skill in the art will appreciate that one or more of these junctions may include a perforation.

In the second embodiment illustrated in FIG. 4, the row scores below the second and third rows 432, 434 may be at least partially perforated with a perforation pattern, without limitation. These second and third rows 432, 434 may be rows of multivariable panels. The rows of multivariable panels may include panels 421, 423, 425, 427, 441, 443, 445, and 447. Row scores in the fourth row 436 may optionally omit perforations, providing significant strength at the included scores. The fourth row 436 may be a row of nonvariable panels. The row of nonvariable panels may include panels 461, 463, 465, and 467. Rows 430 and 438 may include flaps, for example, panels 401, 403, 405, 407, 481, 483, 485, and 487.

In the example box 400, row scores may be at least partially perforated at the following junctions: panel 421 to panel 441, panel 441 to panel 461, panel 423 to panel 443, panel 443 to panel 463, panel 425 to panel 445, panel 445 to panel 465, panel 427 to panel 447, and panel 447 to panel 467. A series of perforations using a perforation pattern may be included to enhance structural strength and separability at the junctions illustrated above. Multiple perforations and/or varied perforations may be included. Borders with substantially solid scoring may be located at the following junctions: panel 401 to panel 421, panel 461 to panel 481, panel 403 to panel 423, panel 463 to panel 483, panel 405 to panel 425, panel 465 to panel 485, panel 407 to panel 427, and panel 467 to panel 487. Those of skill in the art will appreciate that one or more of these junctions may include a perforation.

In the third embodiment illustrated in FIG. 5, the row scores in the second, third, fourth and fifth rows 532, 533, 534, 535 may be at least partially perforated with a perforation pattern. These second, third, fourth, and fifth rows 532, 533, 534, 535 may be rows of multivariable panels. The rows of multivariable panels may include panels 521, 523, 525, 527, 531, 533, 535, 537, 541, 543, 545, 547, 551, 553, 555, and 557. Row scores in the sixth row 536 may optionally omit perforations, providing significant strength at the included scores. The sixth row 536 may be a row of nonvariable panels. The row of nonvariable panels may include panels 561, 563, 565, and 567. Rows 530 and 538 may include flaps, for example, panels 501, 503, 505, 507, 581, 583, 585, and 587.

In the example box 500, borders with substantially solid scoring may be located at the following junctions: panel 501 to panel 521, panel 521 to panel 531, panel 531 to panel 541, panel 541 to panel 551, panel 551 to panel 561, panel 561 to panel 581, panel 503 to panel 523, panel 523 to panel 533, panel 533 to panel 543, panel 543 to panel 553, panel 553 to panel 563, panel 563 to panel 583, panel 505 to panel 525, panel 525 to panel 535, panel 535 to panel 545, panel 545 to panel 555, panel 555 to panel 565, panel 565 to panel 585, panel 507 to panel 527, panel 527 to panel 537, panel 537 to panel 547, panel 547 to panel 557, panel 557 to panel 567, and panel 567 to panel 587. Those of skill in the art will appreciate that one or more of these junctions may include a perforation.

Skilled artisans will appreciate that these examples are provided to illustrate select embodiments of this disclosure and are not intended to limit this disclosure solely to the above-mentioned examples.

The perforations will now be discussed in greater detail. FIGS. 1-14 highlight examples of the perforations, which may also be shown in other figures. Perforations may cause the adjacent panels to remain connected with at least part of the strength as if no perforations were included, such as when not in a separated state. The perforations may provide structural rigidity to the fold and/or score if separation has not occurred. Multiple perforations and/or varied perforations may be included. The perforations may also be provided to help with folding, bending, and/or separation of adjacent panels from one another. Perforations may be provided using one or more techniques, which may include, without limitation, cuts, holes, slits, slots, small cuts, small holes, pinholes, scoring, piercing, boring, punctures, tear lines, punches, perforations with nicked portions, lines of separation, and/or other types of perforations that would be appreciated by a person of skill in the art. The perforations may be created using pins and needles, cutting die and punch, lasers, and/or another perforation technique that may be appreciated by a person of skill in the art. The combination of these various types of perforations of varying characteristics collectively provide the perforation pattern. An area absent of perforations may be a skip. Skips may substantially retain the natural strength of the box material at the area absent of perforations.

The perforations may include one or more small holes, or one or more series of small holes, to be included by the cardboard or other material. Additionally, the perforation may include slits, cuts, lines of separation, perforations with nicked portions, and/or other features for at least partially separating one or more portions of material from another. A perforation pattern may include one or more of such perforation types, which may be included to provide a desired characteristic of strength, separability, perforation density, machining simplicity, and/or other characteristics. Perforation patterns may include a series of perforations.

The perforations in a perforation pattern may include at least one feature to at least partially penetrate the surface of the material on which the perforation is included. In some embodiments, a perforation may pass substantially completely through the cardboard or other material. In alternative embodiments, a perforation may pass at least partially through the cardboard or other material without breaching the back surface of the material. Multiple perforations that pass variable distances through the material may be included in a series of perforations, without limitation.

In one example, at least part of the perforations in a perforation pattern may be provided by including a nick. Those of skill in the art will appreciate the practice of nicking. In summary, a nick may be created by a small notch, groove, or indentation into a tool creating a perforation in the material, such as cardboard. Typically, the nick is created by the tooling that makes the box. Nicks may provide additional strength to the connection between adjoining panels, such as by providing an area of material with reduced perforation and may be added as needed. A nick may relate to a skip. In some embodiments, a nick may produce a small section of reduced cutting and/or puncture. A perforation pattern may include multiple nicks with various characteristics such as length, puncture depth, width, and/or other characteristics that would be appreciated by a person of skill in the art after having the benefit of this disclosure.

In some embodiments, a perforation pattern may include a substantially repeating pattern of perforations and gaps between perforations. These repeating patterns may form or contribute to the perforation pattern. Multiple perforations and/or varied perforations may be included. In some examples, one or more perforations in the substantially repeating perforation pattern may be modified by a nick. A substantially repeating pattern of perforations and gaps may be designed to increase the structural strength of the perforation while maintaining an ability to easily separate the adjoining pieces of material connected by the perforation. The substantially repeating pattern of perforations may also facilitate the use of tooling on the machine for manufacturing boxes or other objects that include the pattern at a large scale. In some embodiments, the perforation pattern may be, or may include portions that are, substantially irregular.

Series of perforations in the perforation pattern included by the boxes and/or packaging devices of this disclosure may include multiple, varying characteristics. For example, the perforations may be characterized by, without limitation, length, size, shape, width, formation type, optional inclusion of nicked portions, and/or other characteristics. For example, perforations in a series of perforations may vary in length, which may advantageously provide an increased ease of separation associated with short length perforations while maintaining the structural strength associated with large length perforations. Skilled artisans will appreciate additional intermediate lengths of perforations may be included in a series of perforations to further customize the properties of the total series of perforation, as may be desired in each application.

Possible length of perforations and/or gaps included in a perforation pattern may include in inches: 1/16", 1/8", 3/16", 1/4", 1/2", and other lengths of perforations and/or gaps. Skilled artisans will appreciate that virtually any other length of perforation and/or gap may be included in a perforation pattern without limitation, including in inches: 1/64", 1/32", 3/64", 5/64", 3/32", 7/64", 9/64", 5/32", 11/64", 13/64", 7/32", 15/64", 17/64", 9/32", 19/64", 5/16", 21/64", 11/32", 23/64", 3/8", 25/64", 13/32", 27/64", 7/16", 29/64", 15/32", 31/64", 33/64", 17/32", 35/64", 9/16", 37/64", 19/32", 39/64", 5/8", 41/64", 21/32", 43/64", 11/16", 45/64", 23/32", 47/64", 3/4", 49/64", 25/32", 51/64", 13/16", 53/64", 27/32", 55/64", 7/8", 57/64", 29/32", 59/64", 15/16", 61/64", 31/32", 63/64", and/or 1"; including in millimeters: 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, and/or 30 mm; and/or other lengths not specifically mentioned as one of the above example lengths.

Additionally, perforations and/or gaps may vary in size and/or shape. For example, perforations may include a linear shape of separated portions that vary in length. In another example, some perforation patterns may include one or more angular, rotated, or otherwise non-parallel orientation of perforations. Additionally, one or more perforations in a perforation pattern may include a non-linear shape, such as a circular, boxed, rectangular, diamond, cross, angular including multiangular, and/or other shape that would be appreciated by a person of skill in the art after having the benefit of this disclosure.

The perforations included by a perforation pattern may be created using a variety of formation types. For example, some of the perforations included by a perforation pattern may be created using a cutting method. In this example, a cutting method may use a blade, which may puncture at least part of the surface of the material. The blade may attach to a vertical member that oscillates between an ascended and descended state, a rotating cutting die, a flat cutting die, knifing, and/or another apparatus capable of puncturing at least part of the material. Perforations included by a perforation pattern may include nicking. In this example, a chisel or bladed end may transfer force applied to a distal striking end to at least partially modify a bladed edge used to separate the material. An array of nicks may create a repeating pattern in the perforation pattern, such as including short and long nicks in the perforated portions. Additional examples of the perforation pattern may include fully cut sections, nicked sections, substantially uncut gap sections, and/or other sections that would be appreciated by those with skill in the art after having the benefit of this disclosure.

Examples of possible perforation patterns will now be discussed in the interest of clearly illustrating some embodiments of this disclosure, and without limitation. The given examples are intended as an open set, with additional configurations that would be appreciated by a person of skill in the art after having the benefit of this disclosure to be included as possible embodiments. The following examples are not intended to limit this disclosure to only the embodiments illustrated in each example.

The perforation pattern may include perforations with multiple length characteristics. Multiple perforations and/or varied perforations may be included. The perforation pattern may also include gaps or skips between the perforations with multiple length characteristics. For example, a perforation pattern may be a pattern that includes a short length A and a long length B, with a skip S between lengths A and B. In additional examples, the perforation may include a pattern of short length A sections and long length B sections configured such to increase the structural strength of the perforation while allowing ease of separation by a user. Additional perforation patterns including additional long sessions C, additional short sessions D, pinholes E, corresponding skips S, and other sections of varying length, shape, and other characteristics, without limitation. Skips S could be virtually any length, for example, A, B, C, D, E and other lengths, without limitation.

Figure 7A:
FIGS. 7A-7K are diagrammatic views of illustrated perforation patterns, according to an embodiment of this disclosure.

In an embodiment provided by this disclosure, an illustrative perforation pattern is shown in FIG. 7A. This example may include a pattern of a short section A, followed by a long section B. Skips may be included between these sections. This pattern may be repeated as desired to form the perforation pattern.

Figure 7B:

In an embodiment provided by this disclosure, an illustrative perforation pattern is shown in FIG. 7B. This example may include a pattern of a short section A, followed by a second short section A, and followed by a long section B. Skips may be included between these sections. This pattern may be repeated as desired to form the perforation pattern.

Figure 7C:

In an embodiment provided by this disclosure, an illustrative perforation pattern is shown in FIG. 7C. This example may include a pattern of a short section A, followed by a long section B, followed by a second long section B, and followed by a second short section A. Skips may be included between these sections. This pattern may be repeated as desired to form the perforation pattern.

Figure 7D:

In an embodiment provided by this disclosure, an illustrative perforation pattern is shown in FIG. 7D. This example may include a pattern of a short section A, followed by a long section B, and followed by a longer section C. Skips may be included between these sections. This pattern may be repeated as desired to form the perforation pattern.

Figure 7E:

In an embodiment provided by this disclosure, an illustrative perforation pattern is shown in FIG. 7E. This example may include a pattern of a short section A, followed by a long section B, followed by a longer section C, and followed by a second long section B. Skips may be included between these sections. This pattern may be repeated as desired to form the perforation pattern.

Figure 7F:

In an embodiment provided by this disclosure, an illustrative perforation pattern is shown in FIG. 7F. This example may include a pattern of a short section A, followed by a long section B, followed by a second short section A, and followed by a longer section C. Skips may be included between these sections. This pattern may be repeated as desired to form the perforation pattern.

Figure 7G:

In an embodiment provided by this disclosure, an illustrative perforation pattern is shown in FIG. 7G. This example may include a pattern of a short section A, followed by a second short section A, followed by a third short section A, and followed by a long section B. Skips may be included between these sections. This pattern may be repeated as desired to form the perforation pattern.

Figure 7H:

In an embodiment provided by this disclosure, an illustrative perforation pattern is shown in FIG. 7H. This example may include a pattern of a short section A, followed by a shorter section D, followed by a second shorter section D, and followed by a third shorter section D. Skips may be included between these sections. This pattern may be repeated as desired to form the perforation pattern.

Figure 7I:

In an embodiment provided by this disclosure, an illustrative perforation pattern is shown in FIG. 7I. This example may include a pattern of a short section A, followed by a shorter section D, followed by a second shorter section D, followed by a long section B, followed by a third shorter section D, and followed by a fourth shorter section D. Skips may be included between these sections. This pattern may be repeated as desired to form the perforation pattern.

Figure 7J:

In an embodiment provided by this disclosure, an illustrative perforation pattern is shown in FIG. 7J. This example may include a pattern of a short section A, followed by a pinhole section E, followed by a second pinhole section E. Skips may be included between these sections. This pattern may be repeated as desired to form the perforation pattern.

Figure 7K:

In an embodiment provided by this disclosure, an illustrative perforation pattern in an irregular fashion is shown in FIG. 7K. This example may include a pattern of a short section A, followed by a long section B, followed by a short section A, followed by a pinhole section E, followed by a pinhole section E, followed by a longer section C, followed by a short section A, followed by a pinholes section E, followed by a shorter section D, followed by a short section A. This pattern could continue in a repeating, irregular, and/or substantially random manner. Skips may be included between these sections. This pattern may be repeated as desired to form the perforation pattern.

Figure 8:
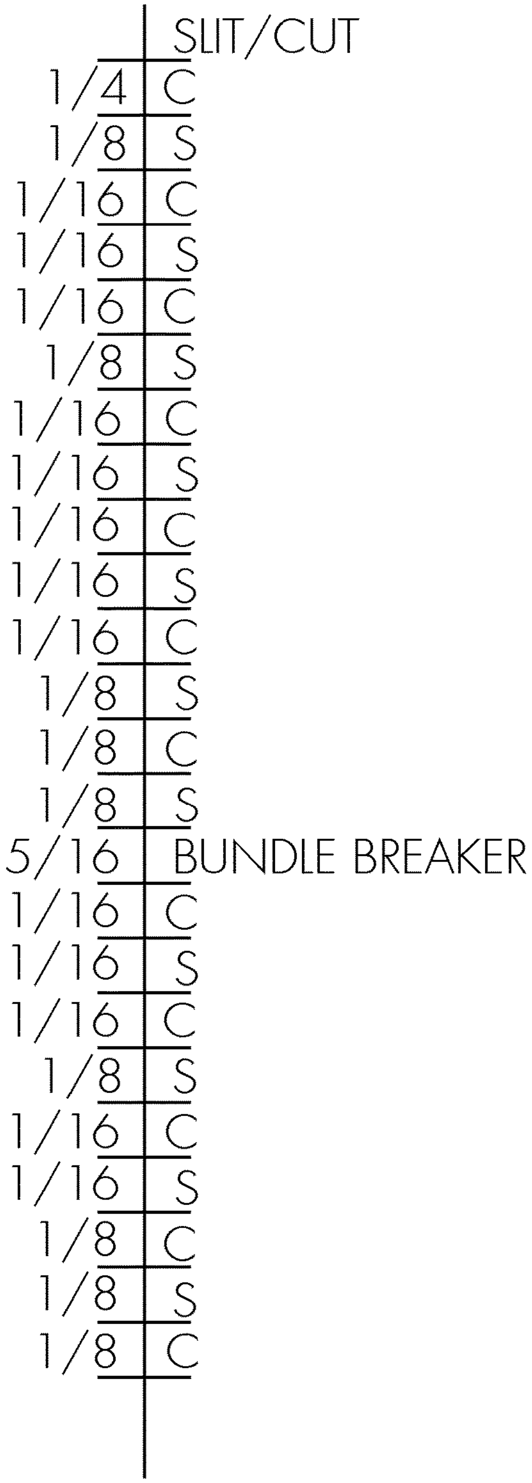
FIG. 8 is a diagrammatic view of an illustrative arrangement of cuts, skips, and bundle breaker aspects, according to an embodiment of this disclosure.
Figure 9:
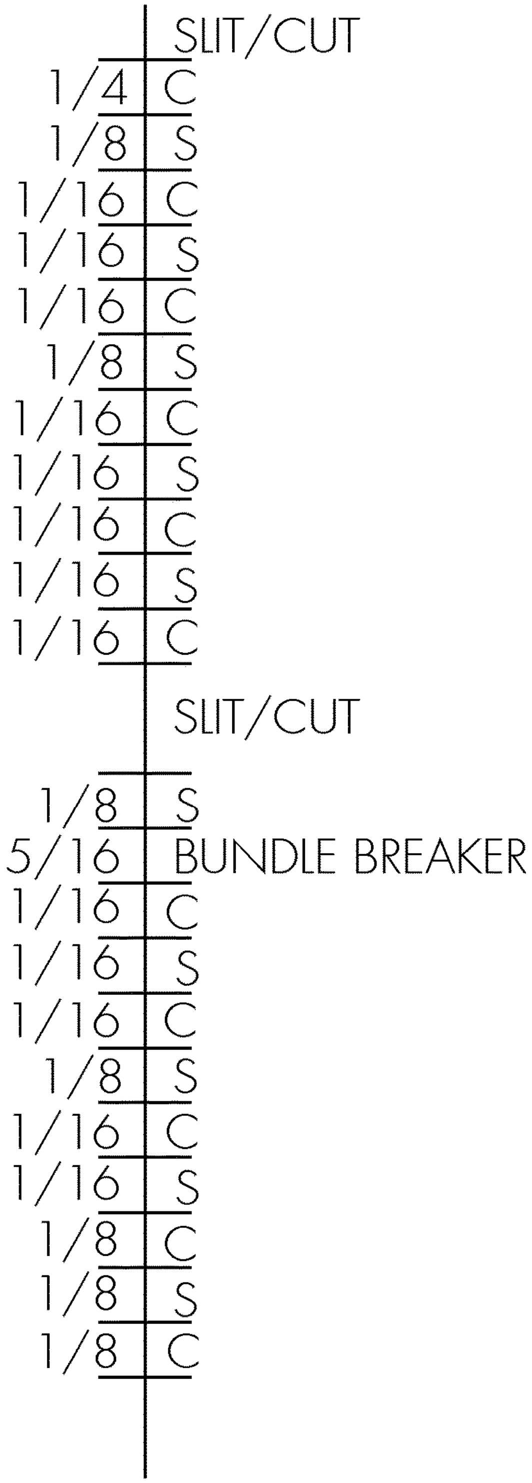
FIG. 9 is a diagrammatic view of an additional illustrative arrangement of cuts, skips, and bundle breaker aspects, according to an embodiment of this disclosure.

The bundle breakers will now be discussed in greater detail. FIGS. 8-9 highlight examples of the bundle breakers, which may also be shown in other figures. In an additional embodiment, the perforation pattern may include one or more bundle breaker perforations. Those of skill in the art will be familiar with bundle breaker perforations. For example, a perforation pattern may include a combination of bundle breaker perforations and other types of perforations. Bundle breaker perforations may advantageously have separation characteristics that differ from other perforations, which may facilitate producing a desired edge finish of panels once separated.

Illustrative perforation patterns will now be discussed, without limitation. As discussed above, the term cut may refer to perforation of varying characteristics such as length. Skips will be represented by a "S" associated the length of the skip. Cuts will be represented by a "C" associated with the length of the cut.

FIG. 8 provides a first illustrative perforation pattern 800 including an array of cuts and skips with varying lengths and characteristics. Illustrative perforation pattern 800 includes a bundle breaker between rows of multivariable panels. In this example, a first row of multivariable panels may include a dimension that is different in at least one direction, for example, longer, than for the second row of multivariable panels.

FIG. 9 provides an alternative second illustrative perforation pattern 900 including an array of cuts and skips with varying lengths and characteristics. Illustrative perforation pattern 900 includes a bundle breaker between rows of multivariable panels. In this example, a first row of multivariable panels may include a dimension that is different in at least one direction, for example, longer, than for the second row of multivariable panels.

In an additional example, provided without limitation, the perforation pattern may include a pattern of 1/8"×1/8"×1/4"×1/4", 1/4"×1/4"×3/16"×3/16", 1/8"×1/4", 1/8"×3/16", 1/8"×1/8"×3/16", and other patterns that would be appreciated by those of skill in the art after having the benefit of this disclosure. All dimensions given in these examples are provided to illustrate the variability between cuts, skips, bundle breakers, and other types of perforations includable in the perforation pattern. The given dimensions are not intended to limit this disclosure in any way.

Some additional example configurations of boxes and packaging consistent with this disclosure will be provided below to illustrate some possible configurations of the boxes and/or packaging provided for by this disclosure. Those of skill in the art will appreciate additional variations of boxes and/or packaging that is consistent with the scope and spirit of this disclosure. These additional variations that would be appreciated by skilled artisans are intended to be additionally included by this disclosure. The following examples may or may not include a slit or other type of perforation on the top of the first or second multi-depths, such as provided by the rows of multivariable panels. Additionally, the figures associated to the drawings may be provided not to scale.

Figure 10:
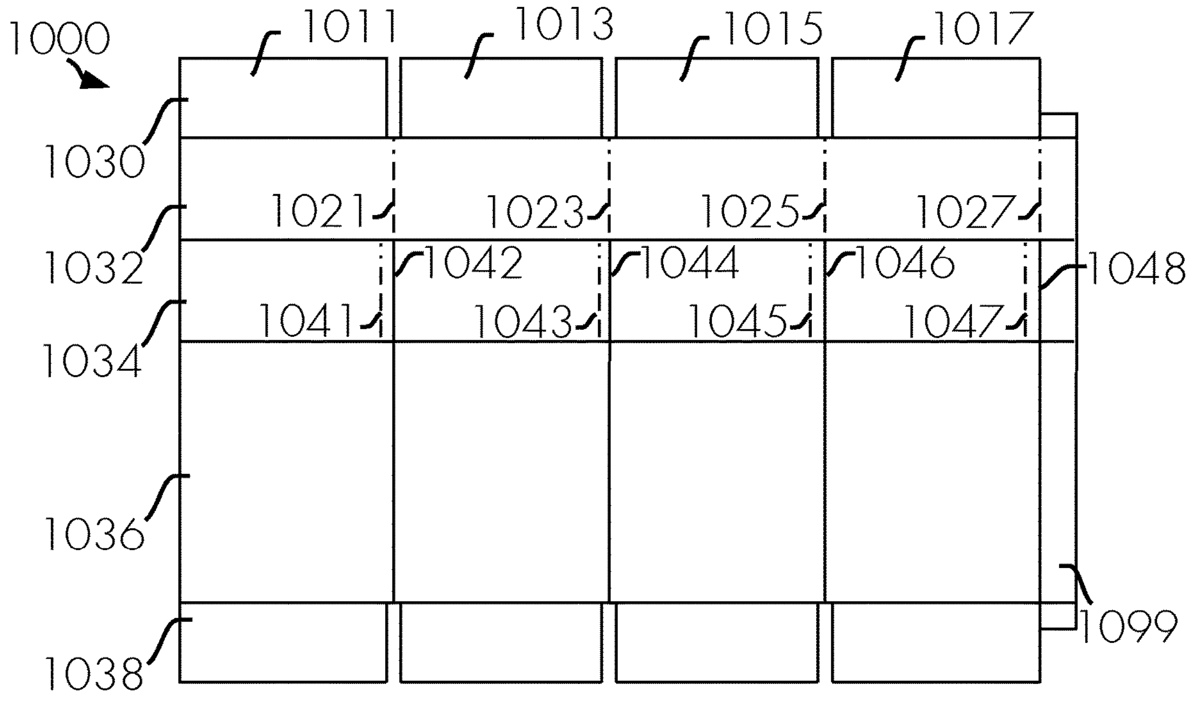
FIG. 10 is a top plan view of an embodiment of the invention with at least one level of offset perforations, according to an embodiment of this disclosure.

For example, FIG. 10 shows an illustrative box 1000 with columns 1011, 1013, 1015, and 1017; rows 1030, 1032, 1034, 1036, and 1038; and an optional glue tab 1099. In box 1000, at least part of the border between adjacent columns may include scoring and substantially all the borders between adjacent rows include substantially solid scoring and/or perforations. If a glue tab is included, the glue tab may or may not be extended either to the top and/or bottom direction, for example, extending to one or more flaps.

One or more of the rows of multivariable panels provided by illustrative box 1000 may include shifted perforation patterns and replacement scoring at the border of panels between adjacent columns. For example the second row of multivariable panels may include a shifted perforation pattern 1041 near the border between columns 1011 and 1013, with a replacement scoring 1042 approximately at the border between columns 1011 and 1013 and substantially aligned with perforation pattern 1021; a shifted perforation pattern 1043 near the border between columns 1013 and 1015, with a replacement scoring 1044 approximately at the border between columns 1013 and 1015 and substantially aligned with perforation pattern 1023; a shifted perforation pattern 1045 near the border between columns 1015 and 1017, with a replacement scoring 1046 approximately at the border between columns 1015 and 1017 and substantially aligned with perforation pattern 1025; and a shifted perforation pattern 1047 near the border between columns 1017 and an optional glue tab 1099, with a replacement scoring 1048 approximately at the border between columns 1017 and the optional glue tab 1099 and substantially aligned with perforation pattern 1027. In this example, perforations may be shifted from the perforation located above, below, or otherwise near the shifted perforation. Various perforations in a row of multivariable panels may be shifted differently than other perforations, allowing, but not requiring, uniformity.

Figure 11:
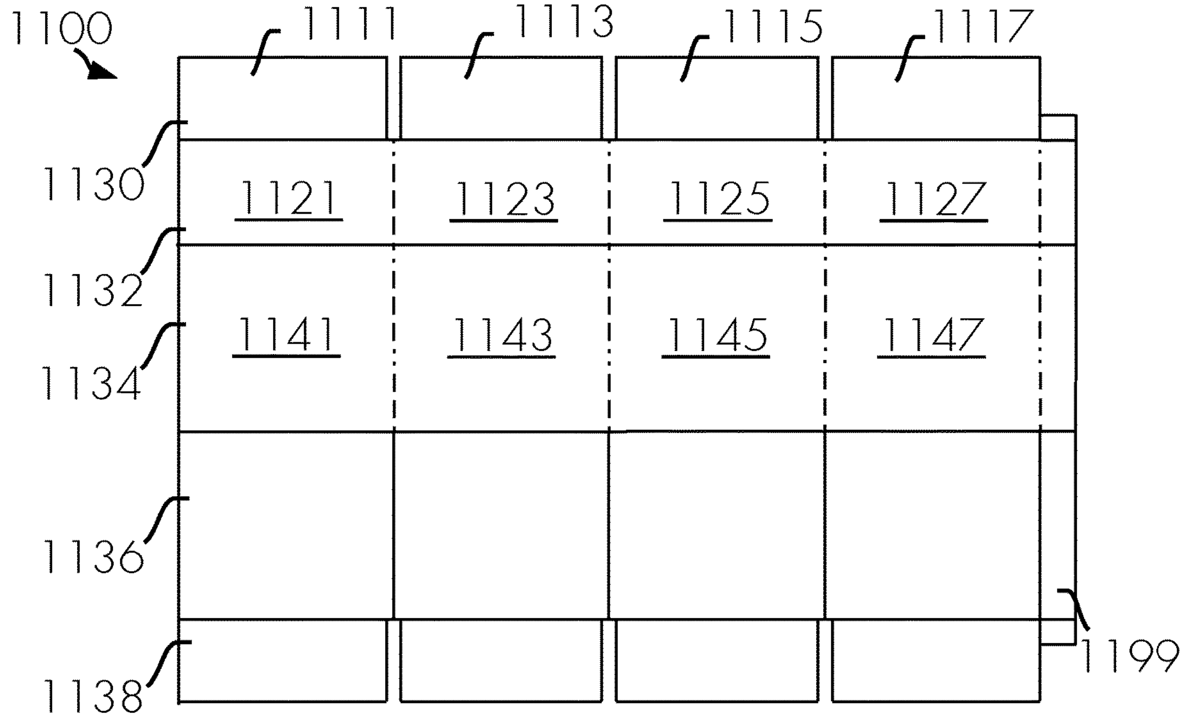
FIG. 11 is a top plan view of an embodiment of the invention with asynchronous perforation patterns at various levels, according to an embodiment of this disclosure.

In another example, FIG. 11 shows an illustrative box 1100 with columns 1111, 1113, 1115, and 1117; rows 1130, 1132, 1134, 1136, and 1138; and an optional glue tab 1199. In box 1100, at least part of the rows of multivariable panels has different dimensions than another row of multivariable panels. For example, the first row of multivariable panels including panels 1121, 1123, 1125, and 1127 may have a longer dimension and larger area that the panels 1141, 1143, 1145, 1147 included in the second row of multivariable panels. The dimensions in a row of panels may also apply to the optional glue tab 1199 included in the row, if such a glue tab is included. In some rows, the glue tab 1199 may be partially included, for example, not extending one or more entire dimensions of the row.

Figure 12:
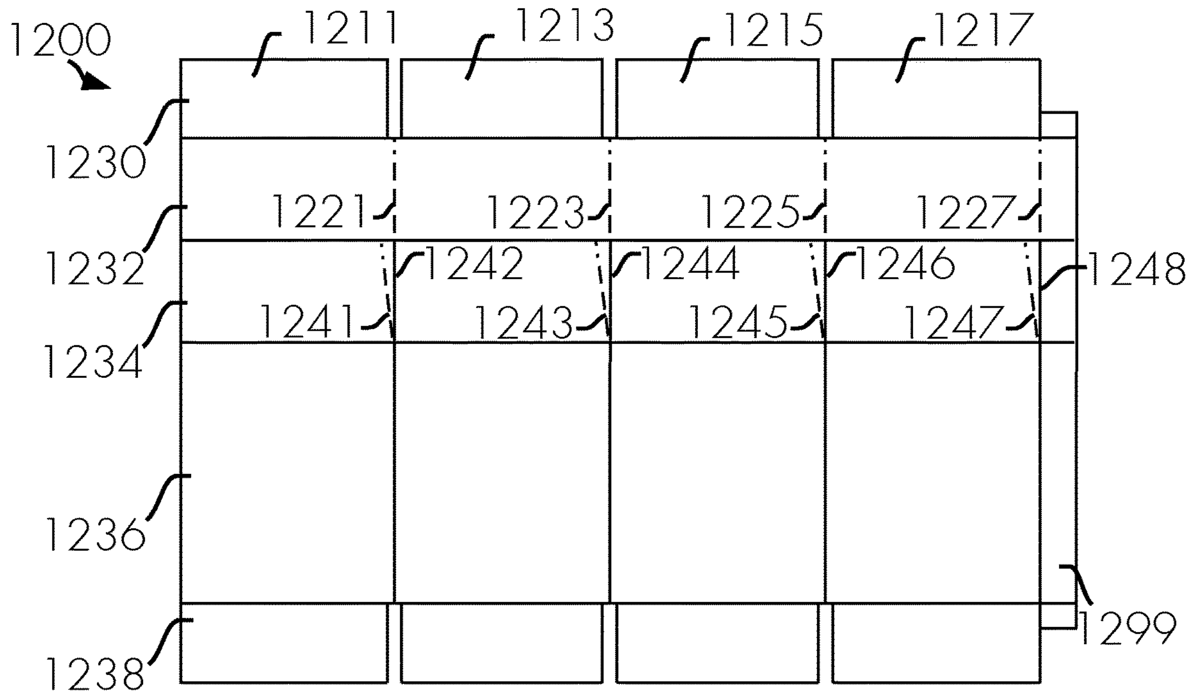
FIG. 12 is a top plan view of an embodiment of the invention with at least one level of angled perforations, according to an embodiment of this disclosure.

In an example, FIG. 12 shows an illustrative box 1200 with columns 1211, 1213, 1215, and 1217; rows 1230, 1232, 1234, 1236, and 1238; and an optional glue tab 1299. In box 1200, at least part of the border between adjacent columns may include scoring and substantially all the borders between adjacent rows include substantially solid scoring and/or perforations. If a glue tab is included, the glue tab may or may not be extended either to the top and/or bottom direction, for example, extending to one or more flaps.

One or more of the rows of multivariable panels provided by illustrative box 1200 may include angled perforation patterns and replacement scoring at the border of panels between adjacent columns. In this example, the angling is more distant from the border of adjacent panels near the top of the panel and closer to the border of adjacent panels near the bottom of the panel. The distant angling may be included as a shifted portion. Angles may vary from panel to panel or be the same.

For example the second row of multivariable panels may include an angled perforation pattern 1241 near the border between columns 1211 and 1213, with a replacement scoring 1242 approximately at the border between columns 1211 and 1213 and substantially aligned with perforation pattern 1221; an angled perforation pattern 1243 near the border between columns 1213 and 1215, with a replacement scoring 1244 approximately at the border between columns 1213 and 1215 and substantially aligned with perforation pattern 1223; a shifted perforation pattern 1245 near the border between columns 1215 and 1217, with a replacement scoring 1246 approximately at the border between columns 1215 and 1217 and substantially aligned with perforation pattern 1225; and an angled perforation pattern 1247 near the border between columns 1217 and an optional glue tab 1299, with a replacement scoring 1248 approximately at the border between columns 1217 and the optional glue tab 1299 and substantially aligned with perforation pattern 1227. In this example, perforations may be shifted from the perforation located above, below, or otherwise near the shifted perforation. Various perforations in a row of multivariable panels may be shifted differently than other perforations, allowing, but not requiring, uniformity.

Figure 13:
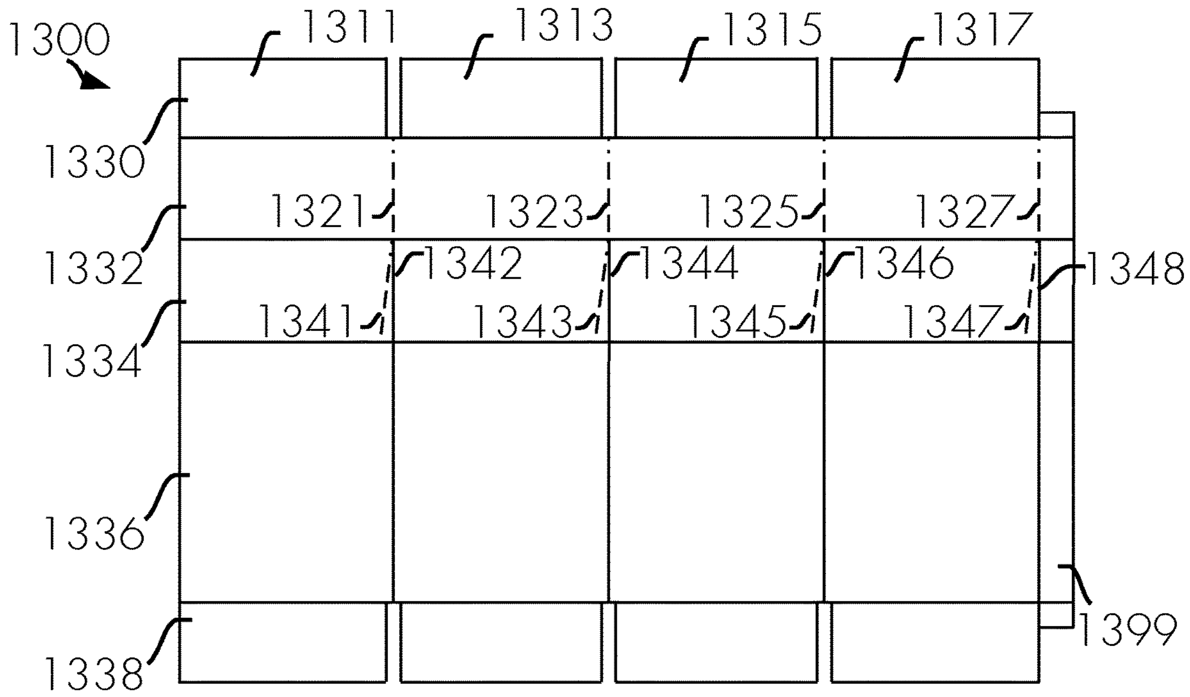
FIG. 13 is a top plan view of an additional embodiment of the invention with at least one level of angled perforations, according to an embodiment of this disclosure.

In another example, FIG. 13 shows an illustrative box 1300 with columns 1311, 1313, 1315, and 1317; rows 1330, 1332, 1334, 1336, and 1338; and an optional glue tab 1399. In box 1300, at least part of the border between adjacent columns may include scoring and substantially all the borders between adjacent rows include substantially solid scoring and/or perforations. If a glue tab is included, the glue tab may or may not be extended either to the top and/or bottom direction, for example, extending to one or more flaps.

One or more of the rows of multivariable panels provided by illustrative box 1300 may include angled perforation patterns and replacement scoring at the border of panels between adjacent columns. In this example, the angling is more distant from the border of adjacent panels near the bottom of the panel and closer to the border of adjacent panels near the top of the panel. The distant angling may be included as a shifted portion.

For example the second row of multivariable panels may include an angled perforation pattern 1341 near the border between columns 1311 and 1313, with a replacement scoring 1342 approximately at the border between columns 1311 and 1313 and substantially aligned with perforation pattern 1321; an angled perforation pattern 1343 near the border between columns 1313 and 1315, with a replacement scoring 1344 approximately at the border between columns 1313 and 1315 and substantially aligned with perforation pattern 1323; an angled perforation pattern 1345 near the border between columns 1315 and 1317, with a replacement scoring 1346 approximately at the border between columns 1315 and 1317 and substantially aligned with perforation pattern 1325; and an angled perforation pattern 1347 near the border between columns 1317 and an optional glue tab 1399, with a replacement scoring 1348 approximately at the border between columns 1317 and the optional glue tab 1399 and substantially aligned with perforation pattern 1327. In this example, at least part of the perforations may be angled and/or shifted from the perforation located above, below, or otherwise near the angled and/or shifted perforation. Various perforations in a row of multivariable panels may be angled and/or shifted differently than other perforations, allowing, but not requiring, uniformity.

Figure 14:
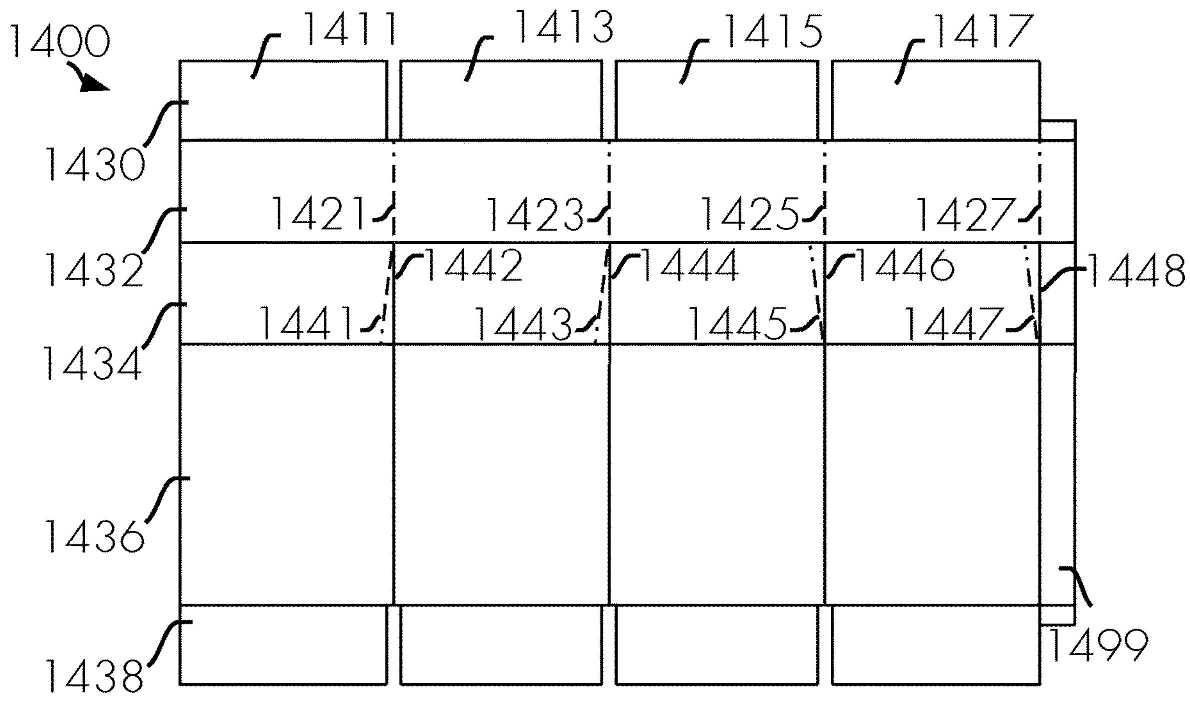
FIG. 14 is a top plan view of an additional embodiment of the invention with at least one level of angled perforations, according to an embodiment of this disclosure.

In an example, FIG. 14 shows an illustrative box 1400 with columns 1411, 1413, 1415, and 1417; rows 1430, 1432, 1434, 1436, and 1438; and an optional glue tab 1499. In box 1400, at least part of the border between adjacent columns may include scoring and substantially all the borders between adjacent rows include substantially solid scoring and/or perforations. If a glue tab is included, the glue tab may or may not be extended either to the top and/or bottom direction, for example, extending to one or more flaps.

One or more of the rows of multivariable panels provided by illustrative box 1400 may include angled perforation patterns and replacement scoring at the border of panels between adjacent columns. In this example, the angling in columns 1411 and 1413 is more distant from the border of adjacent panels near the bottom of the panel and closer to the border of adjacent panels near the top of the panel. Additionally, in this example, the angling in columns 1415 and 1417 is more distant from the border of adjacent panels near the top of the panel and closer to the border of adjacent panels near the bottom of the panel. The distant angling may be included as a shifted portion.

For example the second row of multivariable panels may include an angled perforation pattern 1441 near the border between columns 1411 and 1413, with a replacement scoring 1442 approximately at the border between columns 1411 and 1413 and substantially aligned with perforation pattern 1421; an angled perforation pattern 1443 near the border between columns 1413 and 1415, with a replacement scoring 1444 approximately at the border between columns 1413 and 1415 and substantially aligned with perforation pattern 1423; an angled perforation pattern 1445 near the border between columns 1415 and 1417, with a replacement scoring 1446 approximately at the border between columns 1415 and 1417 and substantially aligned with perforation pattern 1425; and an angled perforation pattern 1447 near the border between columns 1417 and an optional glue tab 1499, with a replacement scoring 1448 approximately at the border between columns 1417 and the optional glue tab 1499 and substantially aligned with perforation pattern 1427. In this example, at least part of the perforations may be angled and/or shifted from the perforation located above, below, or otherwise near the angled and/or shifted perforation. Various perforations in a row of multivariable panels may be angled and/or shifted differently than other perforations, allowing, but not requiring, uniformity.

Figure 15:
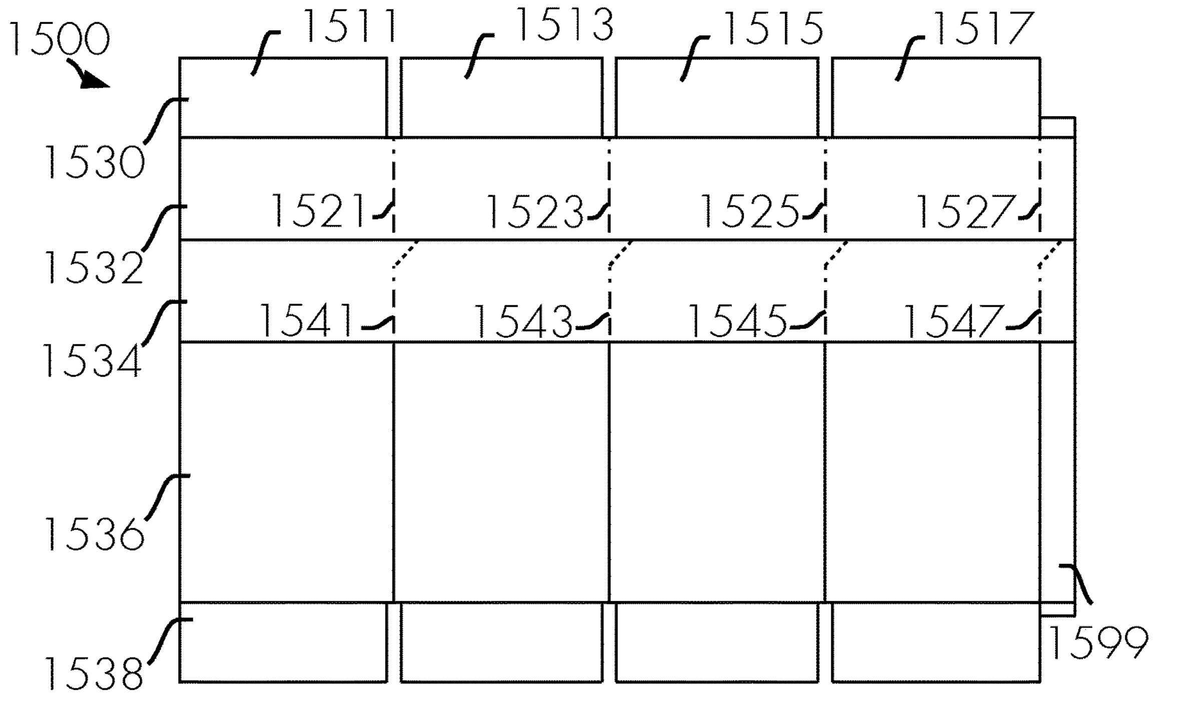
FIG. 15 is a top plan view of an additional embodiment of the invention with at least one level of angled perforations, according to an embodiment of this disclosure.

In another example, FIG. 15 shows an illustrative box 1500 with columns 1511, 1513, 1515, and 1517; rows 1530, 1532, 1534, 1536, and 1538; and an optional glue tab 1599. In box 1500, at least part of the border between adjacent columns may include scoring and substantially all the borders between adjacent rows include substantially solid scoring and/or perforations. If a glue tab is included, the glue tab may or may not be extended either to the top and/or bottom direction, for example, extending to one or more flaps.

One or more of the rows of multivariable panels provided by illustrative box 1500 may include at least partially angled perforation patterns and/or replacement scoring at the border of panels between adjacent columns. In this example, the angling is more distant from the border of adjacent panels near the top of the panel and closer to the border of adjacent panels partially down from the top of the panel. At least part of the perforated pattern may be approximately parallel with a border between the patterns. The distant angling may be included as a shifted portion. Angles may vary from panel to panel or be the same.

For example the second row of multivariable panels may include an angled perforation pattern 1541 near the border between columns 1511 and 1513, with a substantially vertical section approximately at the border between columns 1511 and 1513 and substantially aligned with perforation pattern 1521; an angled perforation pattern 1543 near the border between columns 1513 and 1515, with a substantially vertical section approximately at the border between columns 1513 and 1515 and substantially aligned with perforation pattern 1523; a shifted perforation pattern 1545 near the border between columns 1515 and 1517, with a substantially vertical section approximately at the border between columns 1515 and 1517 and substantially aligned with perforation pattern 1525; and an angled perforation pattern 1547 near the border between columns 1517 and an optional glue tab 1599, with a substantially vertical section approximately at the border between columns 1517 and the optional glue tab 1599 and substantially aligned with perforation pattern 1527. In this example, perforations may include at least a partial section shifted from the perforation located above, below, or otherwise near the shifted section of the perforation. Various perforations in a row of multivariable panels may be shifted differently than other perforations, allowing, but not requiring, uniformity.

Figure 16:
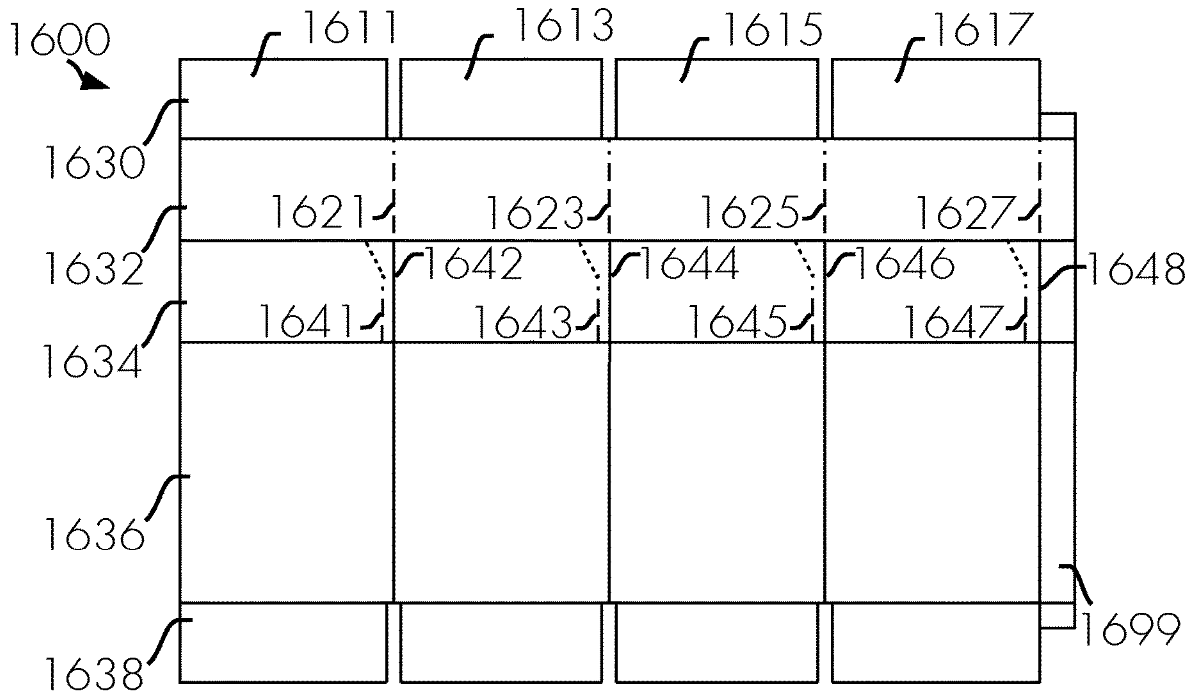
FIG. 16 is a top plan view of an additional embodiment of the invention with at least one level of angled perforations, according to an embodiment of this disclosure.

In an additional example, FIG. 16 shows an illustrative box 1600 with columns 1611, 1613, 1615, and 1617; rows 1630, 1632, 1634, 1636, and 1638; and an optional glue tab 1699. In box 1600, at least part of the border between adjacent columns may include scoring and substantially all the borders between adjacent rows include substantially solid scoring and/or perforations. If a glue tab is included, the glue tab may or may not be extended either to the top and/or bottom direction, for example, extending to one or more flaps.

One or more of the rows of multivariable panels provided by illustrative box 1600 may include at least partially angled perforation patterns and/or replacement scoring at the border of panels between adjacent columns. The angling may be provided on a shifted perforation. In this example, the angling may be more distant from the border of adjacent panels near the top of the panel and closer to the border of adjacent panels partially down from the top of the panel. The distant angling may be included as a shifted portion, and may extend from a shifted perforation. Angles may vary from panel to panel or be the same.

For example the second row of multivariable panels may include a shifted perforation pattern 1641 that includes an angle portion near the border between columns 1611 and 1613, with a replacement scoring 1642 approximately at the border between columns 1611 and 1613 and substantially aligned with perforation pattern 1621; an angled perforation pattern 1643 that includes an angle portion near the border between columns 1613 and 1615, with a replacement scoring 1644 approximately at the border between columns 1613 and 1615 and substantially aligned with perforation pattern 1623; a shifted perforation pattern 1645 that includes an angle portion near the border between columns 1615 and 1617, with a replacement scoring 1646 approximately at the border between columns 1615 and 1617 and substantially aligned with perforation pattern 1625; and an angled perforation pattern 1647 that includes an angle portion near the border between columns 1617 and an optional glue tab 1699, with a replacement scoring 1648 approximately at the border between columns 1617 and the optional glue tab 1699 and substantially aligned with perforation pattern 1627. In this example, perforations may be shifted from the perforation located above, below, or otherwise near the shifted perforation. The shifted portion may include one or more vertical segments, one or more angled segments, and/or one or more other types of segments, without limitation. Various perforations in a row of multivariable panels may be shifted differently than other perforations, allowing, but not requiring, uniformity.

Additional examples will be appreciated by those of skill in the art after having the benefit of this disclosure. Skilled artisans will appreciate additional configurations of perforation patterns including various shifts, multiple shifts, alternative angles, multiple angles at a row of multivariable panels, multiple shifts at a row of multivariable panels, and other combinations and derivations, without limitation.

INDUSTRIAL APPLICABILTY

In operation, a method may be provided to produce a packaging device with improved folding, bending, and separation of adjacent panels. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

In one example, a user of a multivariable box enabled by this disclosure may use a single box to package objects of varying dimensions. For taller or larger objects, the user may elect not to break the perforations between adjacent columns for the rows of multivariable panels. This selection would allow the user to enjoy the full provided volume of the box in its largest configuration. For smaller objects, the user may break the perforations between adjacent columns for a desired row of multivariable panels. This selection would allow the user to enjoy an adequate volume of the box commensurate to the object being packed within the box. The reduced rows of multivariable panels may be converted into flaps. Due to the perforation pattern, the strength of the box at the rows of multivariable panels that are not broken down or converted into flaps may be substantially maintained. The multivariable boxes provided by this disclosure advantageously do not require a knife to cut a box to a desired level.

In another example, a user may configure a sheet of material into packaging enabled by this disclosure by arranging panels in adjacent columns. This arrangement of panels may include arranging a row of nonvariable panels at least partially bordered by nonvariable row scoring between the adjacent columns and arranging a row of multivariable panels at least partially bordered by a perforation pattern between the adjacent columns. The perforation pattern may include various cuts and skips of varying lengths. The user may arrange flaps to be substantially separated between the adjacent columns. The user may configure a dimension of the packaging as manipulable via at least partially separating the adjacent columns in the row of multivariable panels. Separating at least some of the adjacent columns in the row of multivariable columns may transform the panels of the row of multivariable columns into the flaps.

The perforation pattern may include a multiple perforation pattern segments of different patterns. The user may also arrange multiple rows of multivariable panels associated with the first perforation pattern. Each row of multivariable panels may be the same, similar, and/or different than another row.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A perforation pattern located at least partially between adjacent columns provided by packaging, the perforation pattern comprising:

cuts comprising a first cut characteristic and a second cut characteristic;

skips;

wherein the cuts and the skips are arranged in at least a first perforation pattern and a second perforation pattern included by the perforation pattern;

wherein the perforation pattern is applied to the packaging comprising panels arranged in the adjacent columns, the packaging comprising:

a row of nonvariable panels at least partially bordered via nonvariable row scoring between the adjacent columns, and a row of multivariable panels at least partially bordered via the perforation pattern between the adjacent columns; and wherein a dimension of the packaging is manipulable via at least partially separating the adjacent columns in the row of multivariable panels such that the panels that are separated are selectively folded such to operate analogous to flaps that are substantially separated between the adjacent columns without requiring removal of the panels that are separated.

2. The perforation pattern of claim 1, wherein the first perforation pattern differs from the second perforation pattern.

3. The perforation pattern of claim 1, wherein the row of multivariable panels comprises:

a first row of multivariable panels associated with the first perforation pattern; and a second row of multivariable panels associated with the second perforation pattern.

4. The perforation pattern of claim 1, wherein the skips comprise a first skip characteristic and a second skip characteristic.

5. The perforation pattern of claim 4, wherein the skips comprise:

a first skip having the first skip characteristic, and a second skip having the second skip characteristic.

6. The perforation pattern of claim 1, wherein the cuts comprise:

a first cut having the first cut characteristic, and a second cut having the second cut characteristic.

7. The perforation pattern of claim 1, wherein the perforation pattern is at least partially irregular.

8. The perforation pattern of claim 1, wherein the adjacent columns of the packaging further comprise:

flaps substantially separated between the adjacent columns; and wherein at least partially separating the adjacent columns in the row of multivariable columns transforms the panels of the row of multivariable columns into the flaps.

9. The perforation pattern of claim 1, further comprising:

a glue tab operatively connected to at least one of the panels.

10. The perforation pattern of claim 1, further comprising a pinhole.

11. The perforation pattern of claim 1, wherein the panels are arranged in at least three columns.

12. The perforation pattern of claim 1, further comprising an angle.

13. The perforation pattern of claim 1, further comprising:

a shifted portion at least partially shifted from scoring located at the adjacent columns in the row of multivariable panels.

14. The packaging of claim 1, wherein the first cut characteristic is defined by a first cut length, and wherein the second cut characteristic is defined by a second cut length that is different than the first cut length.

15. A perforation pattern located at least partially between adjacent columns provided by packaging, the perforation pattern comprising:

cuts comprising a first cut characteristic and a second cut characteristic;

skips;

wherein the perforation pattern is applied to the packaging comprising panels arranged in the adjacent columns, the packaging comprising:

a row of nonvariable panels at least partially bordered via nonvariable row scoring between the adjacent columns, and a row of multivariable panels at least partially bordered via the perforation pattern between the adjacent columns;

wherein a dimension of the packaging is manipulable via at least partially separating the adjacent columns in the row of multivariable panels such that the panels that are separated are selectively folded such to operate analogous to flaps that are substantially separated between the adjacent columns without requiring removal of the panels that are separated; and wherein the row of multivariable panels comprises:

a first row of multivariable panels associated with the first perforation pattern, and a second row of multivariable panels associated with the second perforation pattern.

16. The perforation pattern of claim 15, wherein the cuts and the skips are arranged in at least a first perforation pattern and a second perforation pattern included by the perforation pattern; and wherein the first perforation pattern differs from the second perforation pattern.

17. The perforation pattern of claim 15:

wherein the skips comprise:

a first skip having a first skip characteristic, and a second skip having a second skip characteristic; and wherein the cuts comprise:

a first cut having the first cut characteristic, and a second cut having the second cut characteristic.

* * * * *